Dec. 17, 1968 H. F. RAYFIELD 3,417,387

ERASURE PREVENTION CONTROL FOR COAXIALLY MOUNTED TAPE SUPPLY AND TAKE-UP REELS

Filed Oct. 23, 1965

INVENTOR.
HARRY F. RAYFIELD
BY
Christie, Parker & Hale
ATTORNEYS.

United States Patent Office 3,417,387
Patented Dec. 17, 1968

3,417,387

ERASURE PREVENTION CONTROL FOR COAXIALLY MOUNTED TAPE SUPPLY AND TAKE-UP REELS

Harry F. Rayfield, Arcadia, Calif., assignor to Burroughs Corporation, Detroit, Mich., a corporation of Michigan
Filed Oct. 23, 1965, Ser. No. 503,959
5 Claims. (Cl. 340—174.1)

This invention relates to magnetic tape recorders and, more particularly, to an interlock safety device to prevent inadvertent re-recording on magnetic tape.

Since recording on magnetic tape results in loss of previously recorded information, it has been the practice to provide some interlock system which prevented inadvertent recording on the magnetic tape. In the digital tape field for use with digital processing systems, it has become standardized practice to provide the magnetic tape supply reel with an annular groove. When the reel is in position on the reel hub of the machine, a pin or other mechanism projects into the groove. Where it is necessary that the tape be re-recorded, a plastic ring is inserted in the groove before the reel is mounted on the tape transport. With the plastic ring in position, the groove sensing device actuates the interlock mechanism, permitting the recording or write function to be initiated.

In copending application Ser. No. 459,625, filed May 28, 1965, now U. S. Letters Patent No. 3,345,007 in the name of the same inventor and assigned to the same assignee as the present invention, there is described a magnetic tape transport in which the supply and take-up reels are mounted coaxially, with the supply reel being outermost from the magnetic tape deck so that it can be easily placed on or removed from the drive hub. Since in this arrangement the take-up reel is positioned between the supply reel and the tape deck, the sensing of the "write" lock-out ring presents a unique problem in that the sensing must be done through the inner reel. It is further desirable in the design of any such interlock mechanism to avoid any rubbing contact between relatively stationary parts and the rotating reels.

The present invention is directed to a mechanism for sensing the presence or absence of the "write" lock-out ring on the supply reel which is supported on the tape deck and senses the ring through the inner take-up reel. The mechanism is designed to avoid any sliding or rubbing contact between any relatively rotating parts, thereby providing long life and trouble free operation.

For a more complete understanding of the invention, reference should be made to the accompanying drawings wherein.

Figures 1, 2, 3, 4:
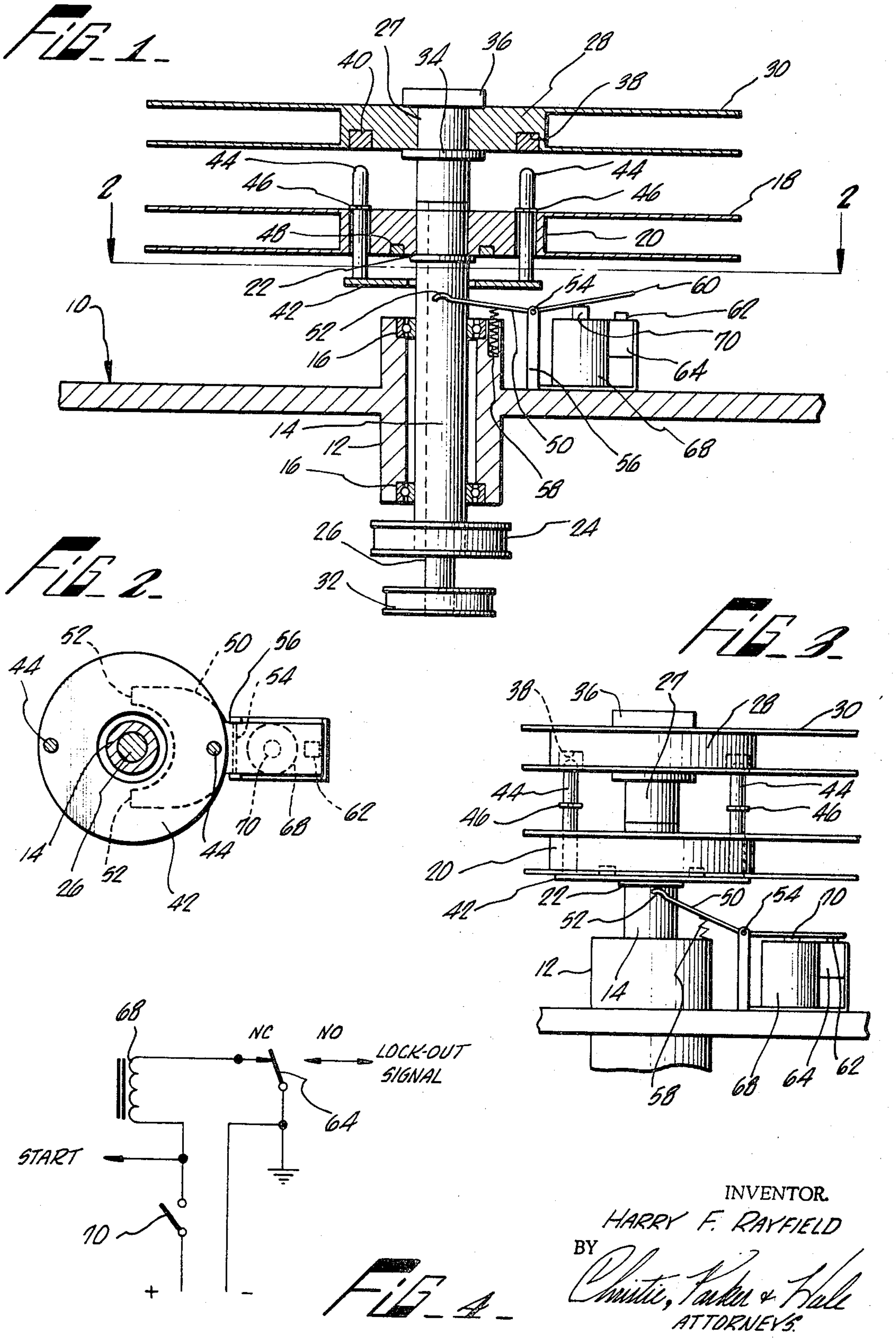
FIGURE 1 is an elevational view partly in section of the preferred embodiment of the invention.
FIGURE 2 is a sectional view taken substantially on the line 2—2 of FIGURE 1.
FIGURE 3 is similar to FIGURE 1 but with the sensing mechanism in its uppermost position.
FIGURE 4 is a schematic diagram of the interlock circuit.

Referring to FIGURES 1 and 2 in detail, the numeral 10 indicates generally the frame of the tape deck which has a hub portion 12 in which is journalled a take-up reel drive shaft 14. The shaft 14 is journalled in the hub 12 by suitable bearings 16. A take-up reel 18 is mounted on the upper end of the shaft 14. The reel 18 has a hub portion 20 which receives the top of the shaft 14 and rests against a shoulder 22. The reel 18 is keyed or otherwise secured to the shaft 14 so as to be rotatable with the shaft 14. The lower end of the shaft 14 is provided with a flat belt pulley 24 or other suitable means by which drive torque is transmitted to the shaft from a reel drive motor (not shown).

A supply reel drive shaft 26 passes through and is journalled in an axial opening in the shaft 14. The upper end of the shaft 26 is enlarged to fit the hub portion 28 of a tape supply reel 30. The enlarged portion 27 provides a shoulder which engages the upper end of the shaft 14 to provide axial support of the supply reel 30 while permitting rotation of the reel 30 through the shaft 26. The lower end of the shaft 26 is provided with a flat belt pulley 32 by means of which rotation is imparted to the supply reel 30. The supply reel 30 is arranged to be removably mounted on the enlarged portion 27 of the upper end of the shaft 26. Thus the supply reel 30 rests against a shoulder 34 and is locked in position by a suitable retainer member 36 on the upper end of the shaft 26.

As pointed out above, the supply reel 30 is normally provided with a coaxial annular groove 38. If it is desired that the tape be rewritten, a "write" lock-out ring 40 is inserted in the annular groove. The presence of this ring is sensed by the interlock mechanism, permitting the magnetic tape machine to energize the recording circuit.

According to the present invention, the interlock mechanism for sensing the presence of the "write" lock-out ring 40 includes an annular flat ring 42 to which are secured two or more vertical pins. The pins 44 pass through corresponding openings in the hub 20 of the take-up reel 18. The pins are slidable in the openings and are secured in position by snap rings 46. Under the action of gravity, the assembly of the ring 42 and vertical pins 44 assumes the lower position shown in FIGURE 1 in which the snap rings 46 engage the top of the hub 20 of the reel 18.

With the ring 40 removed from the groove 38, as shown in FIGURE 3, the ring 42 and the associated pins 44 may be moved to an upper position in which the ring 42 engages the lower surface of the hub 20 of the reel 18. In this position, the pins 44 project up into the groove 38 without actually contacting any surface of the groove. Thus the reels are free to rotate relative to each other without any rubbing contact with the pins in their uppermost position. The ring 42 is retained in the uppermost position by small permanent magnets, such as indicated at 48, located in the bottom surface of the hub 20. The magnets 48 exert sufficient attraction on the ring 42 to clamp it in the upper position against the bottom of the hub 20 but are not sufficiently strong to attract the ring 42 when in its lowermost position.

The mechanism for sensing the position of the ring 42 and also for lifting it into its uppermost position in which the magnets 48 clamp to the ring 42 includes a pivoted member 50. As best shown in FIGURE 2, the pivoted member 50 is in the form of a yoke at one end which provides a pair of projecting fingers 52 which can be pivoted in and out of contact with the ring 42 on either side of the shaft 14. The member 50 is hinged at its center by a suitable hinge arrangement supported at either end by a pin 54 and bracket member 56, the bracket member being secured to the frame of the tape deck 10. The fingers 52 are normally urged upwardly against the ring 42 by a coil spring 58 located in an opening in the hub portion 12 of the frame 10 and engaging the bottom surface of the pivoted member 50. The spring 50 thus acts to urge the fingers 52 to lift the ring 42 enough that the magnets 48 clamp on to the ring 42.

The pivot member 50 includes a stop portion 60 which engages the actuating pin 62 of a microswitch 64. As the spring 58 causes the member 50 to pivot, the stop portion 60 presses down against the pin 62 actuating the microswitch 64. It should be noted that the stop member 60 in engaging the pin 62 stops the pivot action of the member 50 such that the fingers 52 do not actually touch the ring 42 once the ring 42 is clamped in its upper position by the magnets 48. See FIGURE 3.

From the description thus far, it will be seen that if the supply reel 30 is placed on the hub 27 without the ring 40 in place, as shown in FIGURE 3, the reels 18 and 30 are free to rotate without any actual contact between the lifting fingers 52 and the ring 42 or contact between the pins 44 and the grooved hub 28 of the reel 30. At the same time, the microswitch 64 is actuated, providing electrical means of sensing that the "write" lock-out ring is absent, indicating that the magnetic tape may not be erased.

If the ring 40 is inserted in the groove 38 before the reel 30 is mounted on the hub 27, when the reel 30 is inserted on the hub 27, the pins 44 will be pressed downwardly moving the ring 42 out of the field of attraction of the magnets 48. The ring 42 in turn will press on the yoke fingers 52, causing the member 50 to pivot and disengage the stop portion 60 from the microswitch 64. The release of the microswitch 64 provides an electrical indication that the "write" lock-out ring 40 is present and that an erase operation can be performed.

In order to disengage the fingers 52 from the ring 42 when the ring 42 is forced to its lower position by the presence of the ring 40 when the reel 30 is mounted on the hub, there is provided a solenoid 68 having a longitudinally movable armature 70 which engages the stop portion 60 of the pivoted member 50.

When the solenoid 68 is energized, the armature pin 70 is urged upwardly against the stop 60 causing the member 50 to pivot against the action of the spring 58, thereby moving the yoke fingers 52 out of engagement with the ring 42. It will be noted that the downward movement of the ring 42 is limited by the snap rings 46. The resulting condition with the solenoid 68 energized is shown in FIGURE 1.

The electrical circuit for the interlock arrangement is shown in FIGURE 4. The microswitch has normally open contacts NO and normally closed contacts NC. When the stop 60 is lifted off the pins 62, the normally closed contact of the microswitch 64 completes a circuit through the solenoid 68 and through a start switch 70. At the time the supply reel 30 is changed, the start switch 70 is opened, releasing the solenoid 68, permitting the spring 58 to lift the ring 42 in its upper position. When another supply reel is then placed on the hub 27, if it does not contain a lock-out ring 40, the microswitch 64 stays in its normally open condition in which the solenoid 68 is not energized. The normally closed contact provides a completed circuit for indicating a lock-out condition to the associated recording circuit (not shown).

From the above description, it will be recognized that a mechanism is provided for sensing the presence or absence of a "write" lock-out ring on the supply reel when the supply reel is placed in position on the concentric drive shaft with the take-up reel 18. The mechanism provides sensing from the opposite side of the take-up reel 18. However, the mechanism requires no running contact between relatively moving reels and the stationary sensing assembly mounted on the frame of the machine.

What is claimed is:

1. In a tape transport having a pair of coaxially mounted reels, apparatus for detecting the presence of a "write" lock-out ring inserted in a groove in a first reel, the groove being concentrically positioned on the face of the reel closest to the second reel, said apparatus comprising a plurality of pins extending through holes in the second reel directly opposite the groove in the first reel, means for supporting the pins with limited movement of the pins parallel to the axis of rotation of the reels, magnetic means for normally holding the pins and supporting means in position such that the pins project into the groove when the first reel is in position without the "write" lock-out ring, means engaging the pin supporting means for normally urging the supporting means towards the magnetic means, the lock-out ring when in position contacting the pins and forcing the supporting means away from the magnetic means, a switch, means for actuating the switch when the supporting means is moved away from the magnetic means, and solenoid means controlled by the actuating of the switch for withdrawing contact of said urging means with the pin supporting means.

2. In a tape transport having a pair of coaxially mounted reels, a "write" sensing apparatus for detecting the presence of a "write" lock-out ring inserted in a groove in a first reel, the groove being concentrically positioned on the face of the reel closest to the second reel, said apparatus comprising lock-out ring sensing means rotatable with the second reel and movable into and out of the groove in the first reel, magnetic means for normally holding the sensing means in position such that a portion of the sensing means projects into the groove when the first reel is in position without the lock-out ring, the magnetic means releasing the sensing means when the sensing means engages and is displaced by the lock-out ring in the groove, means engaging the sensing means for urging the sensing means toward the groove in the first reel, a switch, means for actuating the switch when the sensing means is released from the magnetic means, and a solenoid controlled by the switch for withdrawing the urging means from the sensing means.

3. In a tape transport having a pair of reels mounted one above the other on concentric drive shafts, a "write" sensing apparatus for detecting the presence of a "write" lock-out ring inserted in a groove in the top reel, the groove being concentrically positioned on the face of the reel closest to the bottom reel, said apparatus comprising pins extending through holes in the bottom reel directly opposite the lock-out ring receiving groove in the top reel, means for supporting the pins with limited movement of the pins parallel to the axis of rotation of the reels, means for normally holding the pins and supporting means in the uppermost position such that the pins project into the groove when the top reel is in position without the lock-out ring, means positioned below the bottom reel for normally urging the pins and supporting means toward the uppermost position, said holding means locking the pins and supporting means out of direct contact with said urging means, and means responsive to downward movement of the pins and supporting means for withdrawing said urging means to permit the pins to assume their lowest position.

4. In a tape transport having a pair of reels mounted one above the other on concentric drive shafts, a "write" sensing apparatus for detecting the presence of a "write" lock-out ring inserted in a groove in the top reel, the groove being concentrically positioned on the face of the reel closest to the bottom reel, said apparatus comprising lock-out ring sensing means rotatable with the second reel and movable into the groove in the first reel when the lock-out ring is removed, means for normally holding the sensing means in the uppermost position such that it projects into the groove when the top reel is in position without the lock-out ring, means positioned below the bottom reel for normally urging the sensing means toward the uppermost position, said holding means locking the sensing means out of direct contact with said urging means, and means responsive to downward movement of the sensing means for withdrawing said urging means to permit the sensing means to assume its lowest position.

5. Apparatus for sensing a "write" ring on a first reel of a recorder having first and second coaxial reels comprising a sensing member extending through a hole in the second reel opposite the "write" ring on the first reel, means for supporting the sensing member for movement parallel to the axis of rotation of the reels, magnetic means for holding the supporting means in position for the sensing member to engage the "write" ring groove on the first reel, means positioned on the opposite side of the second reel from the first reel for urging the sensing member toward the first reel, and means responsive to movement of the sensing member by engagement with the "write" ring when the first reel is placed on the recorder for withdrawing the urging means.

References Cited

UNITED STATES PATENTS

| | | | |
|---|---|---|---|
| 3,335,410 | 8/1967 | Baskin et al. | 340—174.1 |
| 3,199,093 | 8/1965 | Cheney | 179—100.2 |

BERNARD KONICK, *Primary Examiner.*

A. I. NEUSTADT, *Assistant Examiner.*

U.S. Cl. X.R.

179—100.2